United States Patent
Yokoyama et al.

(10) Patent No.: US 10,279,630 B2
(45) Date of Patent: May 7, 2019

(54) PNEUMATIC TIRE

(71) Applicant: SUMITOMO RUBBER INDUSTRIES, LTD., Kobe-shi, Hyogo (JP)

(72) Inventors: Yuka Yokoyama, Kobe (JP); Shuichiro Ono, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/720,018

(22) Filed: Sep. 29, 2017

(65) Prior Publication Data

US 2018/0093533 A1 Apr. 5, 2018

(30) Foreign Application Priority Data

Sep. 30, 2016 (JP) .................. 2016-193696

(51) Int. Cl.
| | | |
|---|---|---|
| *B60C 11/00* | (2006.01) | |
| *B60C 1/00* | (2006.01) | |
| *C08L 9/00* | (2006.01) | |
| *C08L 9/06* | (2006.01) | |
| *C08L 7/00* | (2006.01) | |
| *C08L 91/00* | (2006.01) | |
| *C08K 3/04* | (2006.01) | |
| *C08K 3/36* | (2006.01) | |
| *C08K 5/31* | (2006.01) | |
| *C08K 5/47* | (2006.01) | |
| *C08K 5/18* | (2006.01) | |
| *C08K 5/09* | (2006.01) | |
| *C08K 3/22* | (2006.01) | |
| *C08K 3/06* | (2006.01) | |

(52) U.S. Cl.
CPC .............. *B60C 11/005* (2013.01); *B60C 1/00* (2013.01); *B60C 1/0016* (2013.01); *B60C 11/0008* (2013.01); *C08L 9/00* (2013.01); *C08L 9/06* (2013.01)

(58) Field of Classification Search
CPC . B60C 11/005; B60C 11/0008; B60C 1/0016; B60C 1/00; C08L 9/00; C08L 9/06
USPC ....................................... 152/209.5
See application file for complete search history.

(56) References Cited

U.S. PATENT DOCUMENTS

| | | | |
|---|---|---|---|
| 6,497,261 B1 * | 12/2002 | Fukushima | ........... B60C 1/0016 152/209.4 |
| 2009/0308513 A1 | 12/2009 | Ota | |
| 2014/0027029 A1 * | 1/2014 | Kondo | .................... B60C 11/00 152/209.1 |
| 2015/0174964 A1 * | 6/2015 | Zhao | .................... B60C 11/005 152/209.5 |

FOREIGN PATENT DOCUMENTS

| | | |
|---|---|---|
| JP | 11-181152 A | 7/1999 |
| JP | 2000-16010 A | 1/2000 |
| JP | 2005-15691 A | 1/2005 |
| JP | 2010-31155 A | 2/2010 |
| JP | 2010-90225 A | 4/2010 |
| JP | 2011-88999 A | 5/2011 |
| JP | 2011-126338 A | 6/2011 |
| JP | 2013-112732 A | 6/2013 |
| JP | 2016-6135 A | 1/2016 |
| JP | 2016-102169 A | 6/2016 |

* cited by examiner

*Primary Examiner* — David T Karst
(74) *Attorney, Agent, or Firm* — Birch, Stewart, Kolasch & Birch LLP

(57) ABSTRACT

The present invention provides a cold weather tire achieving a balanced improvement in conductivity, fuel economy, performance on ice and snow, high speed performance (handling stability, grip performance) on snow- and ice-free cold roads, and road noise performance. Provided is a pneumatic tire including: a two-layer tread including a base tread and a cap tread, the base tread being formed of a rubber composition for base treads containing: predetermined amounts of a rubber component including natural rubber and/or polyisoprene rubber, and a filler including silica and carbon black, the cap tread being formed of a rubber composition for cap treads containing a predetermined amount of silica, the cap tread having cells and/or voids.

5 Claims, No Drawings ative effects of Invention

PNEUMATIC TIRE

TECHNICAL FIELD

The present invention relates to a pneumatic tire.

BACKGROUND ART

In a two-layer tread consisting of a cap tread and a base tread, the base tread often contains carbon black alone as filler for durability, rigidity, conductivity, and other properties, while the recent cap tread often contains a large amount of silica (e.g. at least 50% by mass of the total filler) to improve fuel economy and wet grip performance.

Such a two-layer tread with a base tread compound containing carbon black alone as filler and a cap tread compound having a high silica content (silica-rich compound) usually has a large difference in rubber physical properties between the two layers, causing problems such as poor handling stability and road noise generation.

These problems are more significant particularly in cold weather tires including a cap tread with low hardness because of a larger difference between the cap tread and the base tread with high rigidity. Moreover, due to the recent improvement of road conditions, more and more vehicles with cold weather tires are driven at high speeds. However, since conventional cold weather tires place an importance on the performance on ice and snow achieved during running at relatively low speeds, they tend to show inferior handling stability and grip performance during high speed running.

Moreover, foamed treads have lower rubber density and better performance on ice and road noise performance as compared to non-foamed rubbers. However, they have largely different physical properties from base tread rubbers having relatively high rigidity and high rubber density. Furthermore, the incorporation of a large amount of silica can lead to problems with tire conductivity. For example, although Patent Literature 1 proposes the use of a base tread formed of a conductive material, there is a problematic difference in physical properties between the base tread containing a large amount of carbon black and the cap tread.

Thus, a need exists for a technique to improve high speed performance (handling stability, grip performance) on snow- and ice-free cold roads and road noise performance while ensuring performance on ice and snow, conductivity, and other properties, thereby achieving a balanced improvement in properties including fuel economy, performance on ice and snow, high speed performance on snow- and ice-free cold roads, road noise performance, and conductivity.

CITATION LIST

Patent Literature

Patent Literature 1: JP 2011-126338 A

SUMMARY OF INVENTION

Technical Problem

The present invention aims to solve the problems and provide a pneumatic tire, particularly a cold weather tire, that achieves a balanced improvement in conductivity, fuel economy, performance on ice and snow, high speed performance (handling stability, grip performance) on snow- and ice-free cold roads, and road noise performance. The term "cold weather tire" as used herein refers to any tire that is intended to be used at low temperatures and has good performance on ice or snow. Specifically, it conceptually includes any of the following tires: snow tires marked on sidewalls as M+S, M·S, or M&S, and tires for the winter season and/or cold weather sold as winter tires or studless winter tires.

Solution to Problem

The present invention relates to a pneumatic tire, including a two-layer tread including a base tread and a cap tread, the base tread being formed of a rubber composition for base treads that contains: a rubber component including at least one of natural rubber or polyisoprene rubber; and a filler including silica and carbon black, the rubber composition for base treads having a combined amount of the natural rubber and the polyisoprene rubber of 10% by mass or more based on 100% by mass of the rubber component, the rubber composition for base treads containing, per 100 parts by mass of the rubber component, 0.1 to 8 parts by mass of the silica and 30 parts by mass or more of the carbon black, the cap tread being formed of a rubber composition for cap treads that contains, per 100 parts by mass of a rubber component, 40 parts by mass or more of silica, the cap tread having cells or voids or both.

The rubber composition for base treads preferably contains styrene butadiene rubber in an amount of 20% by mass or more based on 100% by mass of the rubber component.

The silica in the rubber composition for cap treads preferably includes a fine particle silica having an average primary particle size of 25 nm or less.

Preferably, the base tread has a volume resistivity (log Ω·cm) of 7 or less, and the pneumatic tire has a volume resistivity (log QΩ·cm) of 8 or less.

The pneumatic tire is preferably a cold weather tire.

Advantageous Effects of Invention

The pneumatic tire of the present invention is provided with a two-layer tread including a base tread and a cap tread, wherein the base tread is formed of a rubber composition for base treads containing predetermined amounts of a rubber component including natural rubber and/or polyisoprene rubber, and a filler including silica and carbon black, while the cap tread is formed of a rubber composition for cap treads containing a predetermined amount of silica, and the cap tread has cells and/or voids.

Such a pneumatic tire achieves a balanced improvement in conductivity, fuel economy, performance on ice and snow, high speed performance (handling stability, grip performance) on snow- and ice-free cold roads, and road noise performance.

DESCRIPTION OF EMBODIMENTS

The pneumatic tire of the present invention is provided with a two-layer tread including a base tread and a cap tread. The base tread is formed of a rubber composition for base treads containing predetermined amounts of a rubber component including natural rubber (NR) and/or polyisoprene rubber (IR), and a filler including silica and carbon black. The cap tread is formed of a rubber composition for cap treads containing a predetermined amount of silica. The cap tread has cells and/or voids.

Since a relatively small amount of silica is contained in the base tread of a two-layer tread consisting of a cap tread having a high silica content and a base tread with a high carbon black content containing a predetermined amount of NR and/or IR, it is possible to achieve a balanced improvement in high speed performance (handling stability, grip performance) on snow- and ice-free cold roads, road noise performance on such cold roads, and fuel economy. Furthermore, the cap tread which has cells or voids has the effect of improving cold weather grip performance due to the flexible rubber and also has the effect of improving performance on ice due to the drainage of water through the cells or voids in the rubber. Thus, these properties are improved. In addition, due to the base tread containing a large amount of carbon black, good conductivity is also ensured.

Therefore, according to the present invention, high speed performance (handling stability, grip performance) on snow- and ice-free cold roads and road noise performance on such cold roads are improved while providing good conductivity, good fuel economy, and good performance on ice and snow, whereby the balance of these properties is significantly improved. In particular, by the use of a base tread in which a small amount of silica is added to a certain formulation of the present invention including a predetermined amount of NR and/or IR in a specific two-layer tread of the present invention, the following effect is achieved: the balance of the properties is significantly (synergistically) improved as compared to when such a small amount of silica is added to other formulations.

[Base Tread]

The pneumatic tire of the present invention includes a base tread formed of a rubber composition for base treads which contains predetermined amounts of a rubber component including NR and/or IR, and a filler including silica and carbon black. The rubber composition for base treads will be described below.

The rubber composition for base treads contains NR and/or IR. Any NR or IR may be used including those known in the tire field.

The combined amount of NR and IR based on 100% by mass of the rubber component is preferably 10% by mass or more, more preferably 20% by mass or more, still more preferably 30% by mass or more. When the combined amount is 10% by mass or more, handling stability on cold roads and resistance to breakage can be improved. The upper limit of the combined amount is not particularly limited, but is preferably 80% by mass or less, more preferably 70% by mass or less.

The rubber composition for base treads preferably contains SBR in order to reduce the difference in rubber physical properties between the cap tread and the base tread of the two-layer tread to improve road noise performance on cold roads and breaking properties. Any SBR may be used, and examples include solution polymerized SBR (S-SBR) and emulsion polymerized SBR (E-SBR).

The amount of SBR based on 100% by mass of the rubber component is preferably 20% by mass or more, more preferably 30% by mass or more, still more preferably 40% by mass or more, in order to improve high speed performance (handling stability, grip performance) on snow- and ice-free cold roads and processability. In view of fuel economy and low temperature properties, the amount of SBR is also preferably 90% by mass or less, more preferably 70% by mass or less, still more preferably 60% by mass or less.

The SBR preferably has a styrene content of 5% by mass or more, more preferably 10% by mass or more. When the styrene content is 5% by mass or more, good processability can be obtained. The styrene content is preferably 40% by mass or less, more preferably 35% by mass or less. When the styrene content is 40% by mass or less, good fuel economy can be obtained. The styrene content herein is determined by $^1$H-NMR analysis.

The ratio of the SBR content in the rubber composition for base treads to that in the rubber composition for cap treads, which will be described later, (mass ratio=base tread/cap tread) is preferably in the range of 100 to 1, more preferably 80 to 1, still more preferably 50 to 2, particularly preferably 40 to 3. When the ratio falls within the range indicated above, the balance of rubber physical properties between the cap and base treads can be improved. In addition, the migration of fillers or other chemicals in the produced tire can be moderately reduced, and furthermore handling stability during high speed running can be improved.

The rubber composition for base treads preferably contains BR in order to achieve a balanced improvement in high speed performance on snow- and ice-free cold roads, breaking properties, and fuel economy. Any BR may be used including those known in the tire field. The BR may have any microstructure, e.g. cis content or vinyl content.

The amount of BR based on 100% by mass of the rubber component is preferably 5% by mass or more, more preferably 10% by mass or more. The amount is preferably 50% by mass or less, more preferably 40% by mass or less. When the amount falls within the range indicated above, a balanced improvement in high speed performance on snow- and ice-free cold roads, breaking properties, and fuel economy can be achieved.

The rubber component may include other rubbers as long as they do not hinder the effects of the present invention. Examples of other rubbers include chloroprene rubber (CR), acrylonitrile butadiene rubber (NBR), ethylene-propylene-diene rubber (EPDM), butyl rubber (IIR), and halogenated butyl rubber (X-IIR). Each type of rubber such as NR may be a single material or a combination of two or more materials.

The rubber composition for base treads contains silica as filler. Any silica may be used, and examples include dry silica (anhydrous silicic acid) and wet silica (hydrous silicic acid). Wet silica is preferred as it contains a large number of silanol groups.

In order to achieve a balanced improvement in fuel economy, high speed performance (handling stability, grip performance) on cold roads, and road noise performance on cold roads, the amount of silica in the rubber composition for base treads is 0.1 to 8 parts by mass per 100 parts by mass of the rubber component. The lower limit of the amount of silica is preferably 0.3 parts by mass or more, more preferably 0.5 parts by mass or more. The upper limit of the amount of silica is preferably 6 parts by mass or less, more preferably 5 parts by mass or less, still more preferably 3 parts by mass or less.

Any type of silica may be used. In view of resistance to breakage and other properties, it may suitably be a silica having a nitrogen adsorption specific surface area ($N_2SA$) of 50 m$^2$/g or more. In view of processability, it may suitably be a silica having a $N_2SA$ of 300 m$^2$/g or less. The $N_2SA$ is more preferably 100 to 300 m$^2$/g, still more preferably 200 to 300 m$^2$/g. The nitrogen adsorption specific surface area of the silica is determined by the BET method in accordance with ASTM D3037-81.

Since the rubber composition for base treads contains only a small amount of silica, there is no particular need to incorporate a silane coupling agent. However, known silane coupling agents may be added as long as they do not hinder the effects of the present invention.

The rubber composition for base treads contains carbon black as filler. This improves conductivity and high speed performance (handling stability, grip performance) on cold roads. Any type of carbon black may be used. For example, in view of breaking properties, HAF, ISAF, SAF, or others may be suitably used.

In the rubber composition for base treads, the amount of carbon black per 100 parts by mass of the rubber component is 30 parts by mass or more, preferably 35 parts by mass or more, more preferably 40 parts by mass or more. The upper limit of the amount of carbon black is not particularly limited, but is preferably 90 parts by mass or less, more preferably 70 parts by mass or less. When the amount falls within the range indicated above, the balance of the properties can be significantly improved.

In view of conductivity, high speed peformance (handling stability, grip performance) on cold roads, and other properties, the carbon black preferably has a nitrogen adsorption specific surface area ($N_2SA$) of 40 to 100 $m^2/g$, more preferably 50 to 85 $m^2/g$. The $N_2SA$ of the carbon black is determined in accordance with JIS K 6217-2:2001.

The rubber composition for base treads preferably contains a plasticizer in order to improve high speed performance (handling stability, grip performance) on snow- and ice-free cold roads and other properties to suitably achieve the effects of the present invention. The term "plasticizer" refers to a material that imparts plasticity to a rubber component. Examples include fats and oils such as process oils, extender oils, vegetable oils, and animal fats; resins such as liquid polymers and liquid resins; and waxes. More specifically, the plasticizer is a component that can be extracted from a rubber composition using acetone.

The amount of the plasticizer per 100 parts by mass of the rubber component is preferably 10 parts by mass or more, more preferably 20 parts by mass or more, still more preferably 30 parts by mass or more, in order to improve cold weather grip performance and to prevent the deterioration of physical properties caused by oil migration between the base tread and the cap tread. The upper limit of the amount of the plasticizer is not particularly limited, but is preferably 150 parts by mass or less, more preferably 100 parts by mass or less, still more preferably 80 parts by mass or less, in order to obtain good resistance to breakage and other properties.

In addition to the aforementioned materials, the rubber composition for base treads may appropriately contain various materials commonly used in the tire industry, such as antioxidants, surfactants, zinc oxide, stearic acid, waxes, vulcanizing agents, and vulcanization accelerators.

The rubber composition for base treads can be prepared by known methods. For example, it is prepared by kneading the components in a rubber kneading machine such as an open roll mill or Banbury mixer and then vulcanizing the kneadate.

As described later, the unvulcanized rubber composition for base treads is then formed into a base tread shape and vulcanized with other tire components, e.g., in a conventional manner to produce a tire including a base tread of the present invention.

The base tread is preferably adjusted to have a volume resistivity (log Ω·cm) of 7 or less. When the volume resistivity is 7 or less, good conductivity can be imparted to the tire. As used herein, volume resistivity can be determined by the method described in EXAMPLES below.

[Cap Tread]

The pneumatic tire of the present invention includes a cap tread produced from a predetermined rubber composition for cap treads as well as the base tread formed of the rubber composition for base treads. The rubber composition for cap treads will be described below.

The rubber composition for cap treads contains a filler including silica. This improves high speed performance (handling stability, grip performance) on cold roads and other properties, thereby suitably achieving the effects of the present invention. Any silica may be used including those mentioned above.

In the rubber composition for cap treads, the amount of silica per 100 parts by mass of the rubber component is 40 parts by mass or more, preferably 50 parts by mass or more, more preferably 60 parts by mass or more, still more preferably 80 parts by mass or more, in order to obtain good abrasion resistance and good performance on ice and snow. The upper limit of the amount of silica is not particularly limited, but is preferably 200 parts by mass or less, more preferably 150 parts by mass or less, in order to obtain good processability and good fuel economy.

The silica in the rubber composition for cap treads is preferably a fine particle silica having an average primary particle size of 25 nm or less, more preferably 22 nm or less, still more preferably 17 nm or less, particularly preferably 14 nm or less. The lower limit of the average primary particle size is not particularly limited, but is preferably 3 nm or more, more preferably 5 nm or more, still more preferably 7 nm or more. When the particle size falls within the range indicated above, the effects of the present invention can be suitably achieved. The average primary particle size can be determined by measuring the sizes of 400 or more primary particles of silica in the visual field of a transmission or scanning electron microscope, and calculating the average of the sizes.

The silica in the rubber composition for cap treads is preferably a fine particle silica having a nitrogen adsorption specific surface area ($N_2SA$) of 190 $m^2/g$ or more in order to significantly improve abrasion resistance and performance on ice and snow. The $N_2SA$ is more preferably 200 $m^2/g$ or more, still more preferably 210 $m^2/g$ or more. The upper limit of the $N_2SA$ is not particularly limited, but is preferably 400 $m^2/g$ or less, more preferably 300 $m^2/g$ or less, in order to obtain good workability and good processability.

Examples of commercial silica include Ultrasil VN3 and 9000GR both available from Evonik, and ZEOSIL P200MP available from Rhodia.

In the rubber composition for cap treads, the amount of the fine particle silica having an average primary particle size of 25 nm or less or a nitrogen adsorption specific surface area of 190 $m^2/g$ or more, per 100 parts by mass of the rubber component, is preferably 50 parts by mass or more, more preferably 55 parts by mass or more, still more preferably 60 parts by mass or more, in order to obtain good abrasion resistance and good performance on ice and snow. The upper limit of the amount of the fine particle silica is not particularly limited, but is preferably 150 parts by mass or less, more preferably 120 parts by mass or less, in order to obtain good processability and good fuel economy.

The amount of the fine particle silica having an average primary particle size of 25 nm or less or a nitrogen adsorption specific surface area of 190 $m^2/g$ or more, based on 100% by mass of the total silica, is preferably 30% by mass or more, more preferably 50% by mass or more, still more preferably 60% by mass or more, in order to obtain good abrasion resistance and good performance on ice and snow. The upper limit of the amount of the fine particle silica is not particularly limited and may be 100% by mass.

The rubber composition for cap treads preferably contains a silane coupling agent together with silica. Examples of the silane coupling agent include sulfide silane coupling agents such as bis(3-triethoxysilylpropyl)disulfide; mercapto silane coupling agents such as 3-mercaptopropyltrimethoxysilane and 3-octanoylthiopropyltriethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Among these, mercapto silane coupling agents are preferred.

The mercapto silane coupling agent (silane coupling agent containing a mercapto group) may suitably be, for example, a compound represented by the following formula (1)

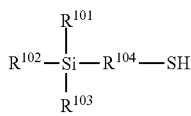

(1)

wherein $R^{101}$ to $R^{103}$ may be the same as or different from one another and each of $R^{101}$ to $R^{103}$ represents a branched or unbranched C1-C12 alkyl group, a branched or unbranched C1-C12 alkoxy group, or a group represented by —O—$(R^{111}$—O$)_z$—$R^{112}$ where the $R^{111}$ groups, whose number is z, may be the same as or different from one another and each $R^{111}$ represents a branched or unbranched divalent C1-C30 hydrocarbon group, $R^{112}$ represents a branched or unbranched C1-C30 alkyl group, a branched or unbranched C2-C30 alkenyl group, a C6-C30 aryl group, or a C7-C30 aralkyl group, and z represents an integer of 1 to 30; and $R^{104}$ represents a branched or unbranched C1-C6 alkylene group.

Preferably, at least one of $R^{101}$ to $R^{103}$ is a group represented by —O—$(R^{111}$—O$)_z$—$R^{112}$. More preferably, two of $R^{101}$ to $R^{103}$ are groups represented by —O—$(R^{111}$—O$)_z$—$R^{112}$ and the other one is a branched or unbranched C1-C12 alkoxy group.

Each of $R^{101}$ to $R^{103}$ (e.g., the alkyl or alkoxy group) preferably has 1 to 5 carbon atoms. $R^{111}$ preferably has 1 to 15 carbon atoms, and examples include alkylene groups, alkenylene groups, alkynylene groups, and arylene groups. The symbol z is preferably an integer of 2 to 20. $R^{112}$ preferably has 3 to 25 carbon atoms. $R^{104}$ preferably has 1 to 5 carbon atoms.

The amount of the silane coupling agent per 100 parts by mass of silica is preferably 0.5 to 20 parts by mass, more preferably 1.5 to 15 parts by mass.

The rubber composition for cap treads preferably contains carbon black as filler. In this case, the balance of the properties can be significantly improved.

The carbon black preferably has a nitrogen adsorption specific surface area ($N_2SA$) of 50 $m^2/g$ or more, more preferably 90 $m^2/g$ or more, in order to provide good abrasion resistance and other properties. The $N_2SA$ is preferably 180 $m^2/g$ or less, more preferably 130 $m^2/g$ or less, in order to obtain good dispersibility.

The amount of carbon black per 100 parts by mass of the rubber component is preferably 5 parts by mass or more, more preferably 8 parts by mass or more. The amount is preferably 60 parts by mass or less, more preferably 40 parts by mass or less. When the amount falls within the range indicated above, the balance of the properties can be significantly improved.

The rubber composition for cap treads preferably contains a plasticizer in order to suitably achieve the effects of the present invention. Examples of the plasticizer include those mentioned above.

The amount of the plasticizer per 100 parts by mass of the rubber component is preferably 20 parts by mass or more, more preferably 30 parts by mass or more, in order to improve processability and performance on ice and snow. The upper limit of the amount of the plasticizer is not particularly limited, but is preferably 150 parts by mass or less, more preferably 130 parts by mass or less, still more preferably 100 parts by mass or less, particularly preferably 80 parts by mass or less, in order to obtain good abrasion resistance and other properties.

The plasticizer in the rubber composition for cap treads is preferably a liquid plasticizer. The term "liquid plasticizer" refers to a plasticizer that is liquid at 20° C., and examples include fats and oils and resins as mentioned above.

The amount of the liquid plasticizer per 100 parts by mass of the rubber component is preferably 15 parts by mass or more, more preferably 20 parts by mass or more, still more preferably 25 parts by mass or more, in order to improve processability and performance on ice and snow. The upper limit of the amount of the liquid plasticizer is not particularly limited, but is preferably 150 parts by mass or less, more preferably 100 parts by mass or less, in order to obtain good abrasion resistance and other properties.

The rubber composition for cap treads preferably contains, as the liquid plasticizer, an oil having a polycyclic aromatic content as determined by IP346 method of less than 3% by mass (low PCA oil). Examples of low PCA oil include mild extraction solvates (MES), treated distillate aromatic extracts (TDAE), heavy naphthenic oils, and vegetable oils. The amount of low PCA oil per 100 parts by mass of the rubber component is preferably 5 to 100 parts by mass, more preferably 10 to 90 parts by mass, still more preferably 15 to 80 parts by mass.

The rubber composition for cap treads preferably contains an organic fiber. Any organic fiber may be used including those known in the tire field. A suitable example is a composite (fiber) consisting of a hydrophilic resin whose surface is provided with a coating layer.

The hydrophilic resin may be a resin that can have an affinity for water, that is, a resin having a hydrophilic group in the molecule. Examples include ethylene-vinyl alcohol copolymers, vinyl alcohol homopolymers, poly(meth)acrylate resins, polyamide resins, aliphatic polyamide-based resins, aromatic polyamide-based resins, polyester resins, polyolefin resins, polyvinyl alcohol-based resins, cellulosic resins, and acrylic resins.

The surface of the composite (fiber) of the hydrophilic resin has an affinity for the rubber component. Preferably, the surface of the composite is provided with a coating layer formed of a low melting point resin having a melting point lower than the maximum vulcanization temperature (hereinafter, also referred to as "low melting point resin"). In this case, the composite (fiber) shows a good affinity for the neighboring rubber component while effectively maintaining the affinity for water of the hydrophilic resin itself. Furthermore, when a foaming agent is incorporated, the hydrophilic resin, which is less likely to melt during vulcanization, can be captured and thus the formation of holes (cells, voids) inside the composite (fiber) can be promoted.

Examples of the resin having an affinity for the rubber component include resins having a solubility parameter (SP value) close to that of the rubber component.

The low melting point resin refers to a resin having a melting point lower than the maximum vulcanization temperature. The maximum vulcanization temperature refers to the maximum temperature reached by the rubber composition during vulcanization. The upper limit of the melting point of the low melting point resin is preferably lower by 10° C. or more, more preferably lower by 20° C. or more than the maximum vulcanization temperature. For example, in the case where the maximum vulcanization temperature is set at 190° C., the melting point of the low melting point resin is usually selected within the range of lower than 190° C., preferably of 180° C. or lower, more preferably of 170° C. or lower. The melting point may be, for example, a peak melting temperature as determined using a DSC apparatus.

The low melting point resin may suitably be, for example, a polyolefinic resin. This allows for the formation of holes (cells, voids) inside the composite (fiber) while improving the dispersibility of the composite (fiber) of the hydrophilic resin in the rubber component.

The polyolefinic resin may have any of branched, linear, or other structures. The polyolefinic resin may also be an ionomer resin produced by crosslinking of ethylene-methacrylic acid copolymer molecules through a metal ion. Specific examples include polyethylene, polypropylene, polybutene, polystyrene, ethylene-propylene copolymers, ethylene-methacrylic acid copolymers, ethylene-ethyl acrylate copolymers, ethylene-propylene-diene terpolymers, ethylene-vinyl acetate copolymers, and ionomer resins of the foregoing.

The composite (fiber) consisting of a hydrophilic resin provided with a coating layer formed of a low melting point resin can be produced, for example, by blending these resins with a mixing mill, and melt-spinning the blend into undrawn yarns, followed by hot drawing of the undrawn yarns into fibers.

The organic fiber, e.g. the composite, has an average length of usually 0.1 to 500 mm, preferably 0.1 to 7 mm, and an average diameter of usually 0.001 to 2 mm, preferably 0.005 to 0.5 mm. It also has an aspect ratio of usually 10 to 4,000, preferably 50 to 2,000. The aspect ratio refers to the ratio of the major axis to the minor axis of the composite (fiber).

The amount of the organic fiber, e.g. the composite, per 100 parts by mass of the rubber component is preferably 0.1 to 100 parts by mass, more preferably 0.1 to 50 parts by mass. When the amount is within the range indicated above, holes can be formed inside the organic fiber to obtain good water drainage while maintaining sufficient durability.

The rubber composition for cap treads preferably contains a foaming agent. For example, when the composite is used, a gas generated by the foaming agent during vulcanization can be entered into the hydrophilic resin through the melted coating layer of a low melting point resin so that cells having a shape according to the shape of the composite (fiber), namely elongated cells can be easily formed. As the tire wears, such cells function as drainage channels to impart water drainage to the tire, thereby improving performance on ice and snow.

Examples of the foaming agent include azodicarbonamide (ADCA), dinitrosopentamethylenetetramine (DPT), dinitrosopentastyrenetetramine, benzenesulfonyl hydrazide derivatives, p,p'-oxybis(benzenesulfonyl hydrazide) (OBSH), carbon dioxide-generating ammonium bicarbonate, sodium bicarbonate, ammonium carbonate, nitrogen-generating nitrososulfonylazo compounds, N,N'-dimethyl-N,N'-dinitrosophthalamide, toluenesulfonyl hydrazide, p-toluenesulfonyl semicarbazide, and p,p'-oxybis(benzenesulfonyl semicarbazide). Among these, azodicarbonamide (ADCA), dinitrosopentamethylenetetramine (DPT), and p,p'-oxybis(benzenesulfonyl hydrazide) (OBSH) are preferred, with azodicarbonamide (ADCA) or p,p'-oxybis(benzenesulfonyl hydrazide) (OBSH) being more preferred. The amount of the foaming agent per 100 parts by mass of the rubber component is preferably 0.1 to 20 parts by mass.

A rubber vulcanizate obtained by vulcanizing the rubber composition containing the foaming agent preferably has an expansion ratio of 0.1% to 50%, more preferably 3% to 40%. When the expansion ratio is within the range indicated above, it is possible to ensure the formation of cells which effectively function as drainage channels, while maintaining a moderate amount of cells, thereby avoiding risk of impairing durability. The expansion ratio of the rubber vulcanizate refers to an average expansion ratio (Vs), specifically one calculated from the following equation (I):

$$Vs=(\rho_0/\rho_1-1)\times100(\%) \qquad (I)$$

wherein $\rho_1$ represents the density (g/cm$^3$) of the rubber vulcanizate (foamed rubber), and $\rho_0$ represents the density (g/cm$^3$) of the solid phase of the rubber vulcanizate (foamed rubber).

The rubber composition for cap treads may appropriately contain various materials as mentioned for the rubber composition for base treads. A tire including the cap tread of the present invention may also be produced similarly as above.

The cap tread has cells and/or voids. The cap tread having cells or voids provides improved cold weather grip performance due to the flexible rubber and also provides improved performance on ice due to the drainage of water through the cells or voids in the rubber. Cells or voids may be formed in the cap tread, for example, by incorporating the organic fiber (e.g. a composite consisting of a hydrophilic resin whose surface is provided with a coating layer), a hollow fiber, and/or the foaming agent into the rubber composition for cap treads.

[Cold Weather Tire]

A pneumatic tire including the rubber composition for cap treads and the rubber composition for base treads can be produced from these rubber compositions by usual methods. Specifically, the unvulcanized rubber compositions for cap treads and for base treads, which contain various additives as needed, may be extruded and processed into the shape of the respective components, and formed and assembled with other tire components on a tire building machine to build an unvulcanized tire. The unvulcanized tire is heated and pressurized in a vulcanizer to produce a tire.

The pneumatic tire of the present invention can be suitably used as a cold weather tire, and may be used as a tire for passenger vehicles, trucks and buses, two-wheeled vehicles, or other vehicles, or as a high performance tire.

The pneumatic tire of the present invention is preferably adjusted to have a volume resistivity (log Ω·cm) of 8 or less. When the volume resistivity is 8 or less, good conductivity can be imparted to the tire. The tire components other than the base tread and the cap tread in the pneumatic tire of the present invention may be appropriately selected from components which can form conductive tires. For example, the base and cap treads according to the present invention may be used in a known conductive tire as described in, for example, JP 2011-126338 A (the disclosure of which is incorporated by reference herein), with other appropriate tire components being selected so as to ensure conductivity.

EXAMPLES

The present invention is specifically described with reference to, but not limited to, examples below.

The chemicals used in examples and comparative examples are listed below.

NR: TSR
BR 1: see Production Example 1 below (modified high-cis BR)
BR 2: BR-150B available from Ube Industries, Ltd.
SBR: Buna SL4525-0 (styrene content: 25% by mass, non-oil extended, unmodified S-SBR) available from Lanxess
Silica: Ultrasil 9000GR (average primary particle size: 16 nm, $N_2SA$: 240 $m^2/g$) available from Evonik
Silane coupling agent: Si363 available from Evonik
Carbon black 1: DIABLACK I (ISAF class, $N_2SA$: 114 $m^2/g$) available from Mitsubishi Chemical Corporation
Carbon black 2: N351 ($N_2SA$: 69 $m^2/g$) available from Cabot Japan
Oil: Vivatec 500 (TDAE oil) available from H&R
Wax: SUNNOC WAX available from Ouchi Shinko Chemical Industrial Co., Ltd.
Stearic acid: Stearic acid beads "Tsubaki" available from NOF Corporation
Antioxidant: NOCRAC 6C (N-(1,3-dimethylbutyl)-N-phenyl-p-phenylenediamine) available from Ouchi Shinko Chemical Industrial Co., Ltd.
Zinc oxide: Zinc oxide #2 available from Mitsui Mining & Smelting Co., Ltd.
Foaming agent: NEOCELLBORN SB#51 (4,4'-oxybis (benzenesulfonyl hydrazide)) available from Eiwa Chemical Ind. Co., Ltd.
Organic fiber: see Production Example 2 below
Sulfur: powdered sulfur available from Tsurumi Chemical Industry Co., Ltd.
Vulcanization accelerator 1: NOCCELER D (N,N'-diphenylguanidine) available from Ouchi Shinko Chemical Industrial Co., Ltd.
Vulcanization accelerator 2: NOCCELER NS (N-tert-butyl-2-benzothiazolylsulfenamide) available from Ouchi Shinko Chemical Industrial Co., Ltd.

Production Example 1: Modified High-Cis BR

A 5 L autoclave in a nitrogen atmosphere was charged with 2.4 kg of cyclohexane and 300 g of 1,3-butadiene. To the autoclave was charged a catalyst previously prepared by reacting and aging 1,3-butadiene (4.5 mmol) with a solution of neodymium versatate (0.09 mmol) in cyclohexane, a solution of methylalumoxane (1.0 mmol) in toluene, and a solution of diisobutylaluminium hydride (3.5 mmol) and diethylaluminum chloride (0.18 mmol) in toluene at 50° C. for 30 minutes, followed by performing a polymerization reaction at 80° C. for 70 minutes.

Next, a solution of 3-glycidoxypropyltrimethoxysilane (4.5 mmol) in toluene was added and reacted for 30 minutes to modify the active terminal, with the reaction temperature being maintained at 60° C. Thereto was added a methanol solution containing 1.5 g of 2,4-di-tert-butyl-p-cresol.

Subsequently, the modified polymer solution was added to 20 L of an aqueous solution adjusted to a pH of 10 with sodium hydroxide, followed by removal of the solvent at 110° C. for two hours and then drying using a roll at 110° C. to obtain BR 1 (modified high-cis BR). The obtained polymer had a cis content of 97% by mass, a vinyl content of 1.1%, and a Mw of 480,000.

The molecular weight, vinyl content, and cis content of the polymer were analyzed as follows.

<Molecular Weight>

The weight average molecular weight (Mw) and number average molecular weight (Mn) were determined by gel permeation chromatography (GPC) under the following conditions (1) to (8).
(1) Apparatus: HLC-8220 available from Tosoh Corporation
(2) Separation column: HM-H (two in series) available from Tosoh Corporation
(3) Measurement temperature: 40° C.
(4) Carrier: tetrahydrofuran
(5) Flow rate: 0.6 mL/minute
(6) Injection amount: 5 µL
(7) Detector: differential refractometer
(8) Molecular weight standards: polystyrene standards <Identification of Polymer Structure>

The structure of the polymer was identified with a device of JNM-ECA series available from JEOL Ltd. The vinyl content and cis content were calculated from the data.

Production Example 2: Production of Organic Fiber (Hydrophilic Resin Fiber Provided with Low Melting Point Resin Coating Layer)

Into a twin screw extruder were introduced 40 parts by mass of polyethylene (NOVATEC HJ360 (MFR: 5.5, melting point: 132° C.) available from Japan Polyethylene Corporation) and 40 parts by mass of an ethylene-vinyl alcohol copolymer (EVAL F104B (MFR: 4.4, melting point: 183° C.) available from Kuraray Co., Ltd.), and they were simultaneously extruded to prepare a hydrophilic resin fiber provided with a coating layer formed of polyethylene in a usual manner. The hydrophilic resin fiber had an average diameter of 20 µm and an average length of 3 mm.

<Method of Preparing Rubber Composition for Cap Treads>

According to each of the formulations shown in Table 1, the materials listed in the Base kneading step section were kneaded in a 1.7 L Banbury mixer (Kobe Steel, Ltd.) at 150° C. for five minutes to give a kneadate. Next, the chemicals listed in the Final kneading step section were added to the kneadate, followed by kneading in an open roll mill at 80° C. for five minutes to obtain an unvulcanized rubber composition.

<Method of Preparing Rubber Composition for Base Treads>

According to each of the formulations shown in Table 2, the materials other than the sulfur and vulcanization accelerator were kneaded in a 1.7 L Banbury mixer (Kobe Steel, Ltd.) at 150° C. for five minutes to give a kneadate. Next, the sulfur and vulcanization accelerator were added to the kneadate, followed by kneading in an open roll mill at 80° C. for five minutes to obtain an unvulcanized rubber composition.

<Method of Preparing Test Tire>

According to each of the specifications shown in Table 3, the unvulcanized rubber composition for cap treads and the unvulcanized rubber composition for base treads were formed into the shape of a cap tread and a base tread, respectively, and then assembled with other tire components on a tire building machine to build an unvulcanized tire, which was then vulcanized at 170° C. for 10 minutes to prepare a test tire (size: 195/65R15, cold weather tire for passenger vehicles).

The test tire was prepared as a conductive tire by connecting the cap tread with the base tread through a conducting component (a component exposed on the surface of the cap tread, such as the component 14 in FIG. 1 of JP 2011-126338 A (the disclosure of which is incorporated by reference herein)) having the same formulation as the base tread, and also using other components having appropriate known formulations.

[Evaluation]

The thus prepared test tires were evaluated as follows. Tables 1 to 3 show the results.

<Expansion Ratio Vs>

The expansion ratio of the cap tread formulations shown in Table 1 was calculated from the above-described equation (I).

<Volume Resistivity of Base Tread>

15 cm×15 cm, 2 mm-thick specimens were prepared from the base tread formulations shown in Table 2, and measured using an electric resistance meter R8340A (Advantest Corp.) at a voltage of 500 V, an ambient temperature of 25° C., and a humidity of 50%. The logarithms (log Ω·cm) of the measured values are displayed as volume resistivity in the Table.

<Tire Conductivity (Volume Resistivity of Tire)>

After each test tire shown in Table 3 was mounted on a normal rim and filled with air to the specified internal pressure of 2.0 MPa, the cap tread was contacted with an iron plate under a load of 4.7 kN. The electric resistance between the rim of the tire and the iron plate at an applied voltage of 100 V was measured. The logarithms (log Ω·cm) of the measured values are displayed as volume resistivity in the Table.

<Handling Stability in Cold Weather, High Speed Conditions>

Each set of test tires was mounted on a front-engine, front-wheel-drive car of 2,000 cc displacement made in Japan. A test driver drove the car at 100 km/h on snow- and ice-free roads at 0° C. to 3° C. at the Asahikawa Tire Proving Ground in Hokkaido, Japan. The test driver subjectively evaluated cornering performance and steering linearity. The subjective evaluation was made relative to the reference comparative example given a score of 100, as follows: A score of 120 was given if the test driver judged the performance was obviously improved; a score of 140 was given if a much better level of performance was observed.

<Grip Performance in Cold Weather, High Speed Conditions>

Each set of test tires was mounted on a front-engine, front-wheel-drive car of 2,000 cc displacement made in Japan. The car was driven on snow- and ice-free roads at 0° C. to 3° C. at the Asahikawa Tire Proving Ground in Hokkaido, Japan. The stopping distance was measured, which corresponded to the distance required for the car to stop after the brakes that lock up were applied at 100 km/h.

The results are expressed as an index using the equation below, with the reference comparative example set equal to 100. A higher index indicates better grip performance (braking performance) in cold weather, high speed conditions.

(Index of grip performance in cold weather, high speed conditions)=(Stopping distance of reference comparative example)/(Stopping distance of each formulation example)×100

<Road Noise Performance in Cold Weather Conditions>

Each set of test tires was mounted on a front-engine, front-wheel-drive car of 2,000 cc displacement made in Japan. The car was run at 100 km/h on snow- and ice-free rough asphalt with a surface temperature of 0° C. to 3° C. in a test course for measuring road noise. The noise level dB(A) inside the car in the driver's window-side ear position was measured during the running. The noise levels are expressed as an index using the equation below, with Comparative Example 1 set equal to 100. A higher index indicates less road noise and more comfort.

(Index of road noise in cold weather conditions)=(Noise level of reference comparative example)/(Noise level of each example)×100

<Fuel Economy>

The rolling resistance of each test tire was measured using a rolling resistance tester by running the test tire mounted on a 15×6 JJ rim at an internal pressure of 230 kPa, a load of 3.43 kN, and a speed of 80 km/h. The results are expressed as an index, with the reference comparative example set equal to 100. A higher index indicates better fuel economy.

<Performance on Ice (Grip Performance on Ice)>

The performance on ice of each set of test tires mounted on a car was evaluated under the following conditions. Each set of test tires was mounted on a front-engine, front-wheel-drive car of 2,000 cc displacement made in Japan. The test was performed on ice at the Asahikawa Tire Proving Ground of Sumitomo Rubber Industries, Ltd. in Hokkaido, Japan. The temperature on ice was −6° C. to −1° C.

Braking performance (brake stopping distance on ice): The stopping distance on ice was measured, which corresponded to the distance required for the car to stop after the brakes that lock up were applied at 30 km/h. The results are expressed as an index using the equation below, with the reference comparative example set equal to 100. A higher index indicates better braking performance on ice.

(Index of grip on ice)=(Stopping distance of reference comparative example)/(Stopping distance of each formulation example)×100

TABLE 1

Rubber composition for cap treads

|  |  |  | Formulation | | |
|---|---|---|---|---|---|
|  |  |  | A | B | C |
| Amount (parts by mass) | Base kneading step | NR | 43 | 40 | 43 |
|  |  | BR1 (modified high-cis BR) | 50 | 58 | 50 |
|  |  | SBR (unmodified) | 7 | 2 | 7 |
|  |  | Silica (16 nm, $N_2SA$ 240) | 80 | 60 | 80 |
|  |  | Silane coupling agent (Si363) | 5 | 4 | 5 |
|  |  | Carbon black 1 ($N_2SA$ 114) | 10 | 30 | 10 |
|  |  | Oil (TDAE) | 30 | 30 | 30 |
|  |  | Stearic acid | 0.5 | 0.5 | 0.5 |
|  |  | Vulcanization accelerator 1 | 1.5 | 1 | 1.5 |
|  |  | Antioxidant | 2 | 2 | 2 |
|  |  | Zinc oxide | 1.2 | 1.2 | 1.2 |
|  | Final kneading step | Sulfur | 1.5 | 1.5 | 1.5 |
|  |  | Foaming agent | 5 | 5 | — |
|  |  | Organic fiber | 0.5 | 0.5 | — |
|  |  | Stearic acid | 1 | 1 | 1 |
|  |  | Vulcanization accelerator 1 | 0.5 | 0.5 | 0.5 |
|  |  | Vulcanization accelerator 2 | 1.7 | 1.5 | 1.5 |
| Expansion ratio (%) |  |  | 32 | 28 | 0 |

TABLE 2

Rubber composition for base treads

|  |  |  | Formulation | | |
|---|---|---|---|---|---|
|  |  |  | a | b | c |
| Amount (parts by mass) | Base kneading step | NR | 40 | 40 | 40 |
|  |  | BR2 (BR150B) | 15 | 15 | 15 |
|  |  | SBR (unmodified) | 45 | 45 | 45 |
|  |  | Silica (16 nm, $N_2SA$ 240) | 5 | — | 40 |

TABLE 2-continued

Rubber composition for base treads

| | | Formulation | | |
|---|---|---|---|---|
| | | a | b | c |
| | Carbon black 2 ($N_2SA$ 69) | 40 | 45 | 5 |
| | Silane coupling agent (Si363) | — | — | 3 |
| | Oil (TDAE) | 30 | 30 | 30 |
| | Wax | 1.5 | 1.5 | 1.5 |
| | Stearic acid | 2 | 2 | 2 |
| | Antioxidant | 2 | 2 | 2 |
| | Zinc oxide | 3 | 3 | 3 |
| Final kneading step | Sulfur | 2.5 | 2.5 | 2.5 |
| | Vulcanization accelerator 2 | 2 | 2 | 2 |
| Volume resistivity (log Ω · cm) | | 7 or less | 7 or less | More than 7 |

TABLE 3

| | Example | | Comparative Example | | |
|---|---|---|---|---|---|
| | 1 | 2 | 1 | 2 | 3 |
| Cap tread | A | B | A | C | A |
| Base tread | a | a | b | a | c |
| Handling stability in cold weather, high speed conditions | 110 | 120 | 100 | 110 | 103 |
| Grip performance in cold weather, high speed conditions | 105 | 119 | 100 | 112 | 104 |
| Road noise in cold weather conditions | 108 | 128 | 100 | 81 | 102 |
| Volume resistivity (log Ω · cm) of tire | 8 or less | 8 or less | 8 or less | 8 or less | more than 8 |
| Fuel economy | 105 | 87 | 100 | 85 | 112 |
| Performance on ice | 106 | 97 | 100 | 86 | 102 |

The results in Tables 1 to 3 demonstrate that the tires of the examples provided with a two-layer tread including a base tread (formulation a) that contained predetermined amounts of NR, silica, and carbon black, and a cap tread (formulation A or B) that contained a predetermined amount of silica and had cells (voids) achieved a balanced improvement in fuel economy, performance on ice and snow, high speed performance (handling stability, grip performance) on snow- and ice-free cold roads, and road noise performance while ensuring good conductivity.

In contrast, the tire of Comparative Example 1 provided with a base tread (formulation b) incorporating no silica and the tire of Comparative Example 2 provided with a cap tread (formulation C) containing no foam (cells) were greatly inferior in overall properties although conductivity was ensured. The tire of Comparative Example 3 provided with a base tread (formulation c) incorporating a large amount of silica and a small amount of carbon black exhibited too low a conductivity to be practically used.

The invention claimed is:

1. A pneumatic tire which achieves a balanced improvement in high speed performance on snow- and ice-free cold roads, road noise performance and fuel economy, comprising a two-layer tread including a base tread and a cap tread,
the base tread being formed of a rubber composition for base treads that comprises: a rubber component including at least one of natural rubber or polyisoprene rubber; and a filler including silica and carbon black,
the rubber composition for base treads comprising, based on 100% by mass of the rubber component, the natural rubber and the polyisoprene rubber in a combined amount of 10% to 80% by mass and styrene butadiene rubber in an amount of 20% to 90% by mass,
the rubber composition for base treads comprising, per 100 parts by mass of the rubber component, 0.5 to 8 parts by mass of the silica and 30 to 90 parts by mass of the carbon black,
the cap tread being formed of a rubber composition for cap treads that comprises, per 100 parts by mass of a rubber component, 40 parts by mass or more of silica,
the cap tread having cells or voids or both.

2. The pneumatic tire according to claim 1,
wherein the rubber composition for base treads contains the styrene butadiene rubber in an amount of 30% to 70% by mass based on 100% by mass of the rubber component.

3. The pneumatic tire according to claim 1,
wherein the silica in the rubber composition for cap treads includes a fine particle silica having an average primary particle size of 25 nm or less.

4. The pneumatic tire according to claim 1,
wherein the base tread has a volume resistivity (log Ω·cm) of 7 or less, and
the pneumatic tire has a volume resistivity (log Ω·cm) of 8 or less.

5. The pneumatic tire according to claim 1, which is a cold weather tire.

* * * * *